No. 881,979. PATENTED MAR. 17, 1908.
J. A. WARREN.
PEANUT PICKER.
APPLICATION FILED DEC. 26, 1905.

Witnesses
T. C. Britt
E. C. Duffy

Inventor
James A. Warren,
By C. E. Duffy
Attorney

No. 881,979. PATENTED MAR. 17, 1908.
J. A. WARREN.
PEANUT PICKER.
APPLICATION FILED DEC. 26, 1905.

Witnesses
T. P. Britt
E. C. Duffy

Inventor
James A. Warren
By C. E. Duffey & Son
Attorney

No. 881,979. PATENTED MAR. 17, 1908.
J. A. WARREN.
PEANUT PICKER.
APPLICATION FILED DEC. 26, 1905.

Witnesses
Inventor
James A. Warren
By C. Ed Duffy
Attorney

UNITED STATES PATENT OFFICE.

JAMES ARTHUR WARREN, OF SURRY, VIRGINIA.

PEANUT-PICKER.

No. 881,979.

Specification of Letters Patent.

Patented March 17, 1908.

Application filed December 26, 1905. Serial No. 293,271.

*To all whom it may concern:*

Be it known that I, JAMES ARTHUR WARREN, a citizen of the United States, residing at Surry, in the county of Surry and State of Virginia, have invented certain new and useful Improvements in Peanut-Pickers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to peanut pickers, and has for its object to provide a machine which will first pick the peanuts from the vines then separate the peanuts and vines, then clean the peanuts, then stem them and lastly deliver the peanuts into suitable sacks.

A further object of my invention is to provide a peanut picker which will handle the peanuts as above set forth without cracking or crushing the same.

With these objects in view my invention consists in the novel construction of the machine, and particularly in the construction of the fingers for picking the peanuts from the vines, and rolls carrying the fingers; in the separator which separates the peanuts from the vines; in the oscillating apron and the fan constituting a second separating device; in the construction for again carrying the peanuts to which a portion of the vine is attached through the picking operation; in the construction of the means for stemming the peanuts, in the arrangement for conveying the stemmed peanuts into a hopper and subjecting the peanuts to a draft of air to finally clean the peanuts, from which hopper they empty into a suitable sack.

Besides the above general constructions, my invention further consists in certain specific constructions and in combinations of parts which will be first fully described and afterwards specifically pointed out in the appended claims.

Referring to the accompanying drawings.

Like numerals of reference indicate the same parts throughout the several figures in which.

1 indicates the machine which comprises a suitable frame 2, mounted on suitable wheels 3. The mechanism within the frame-work is inclosed as shown and a removable hood 4 is arranged at the top of the machine so that access may be had to the interior thereof. On either side as shown is arranged a sliding door 5, also for the purpose of affording access to the interior of the machine and particularly to the picking rolls which will be hereinafter fully described.

6 indicates a platform for the operator, said platform being supported from the frame-work of machine by means of chains 7.

Figure 1:
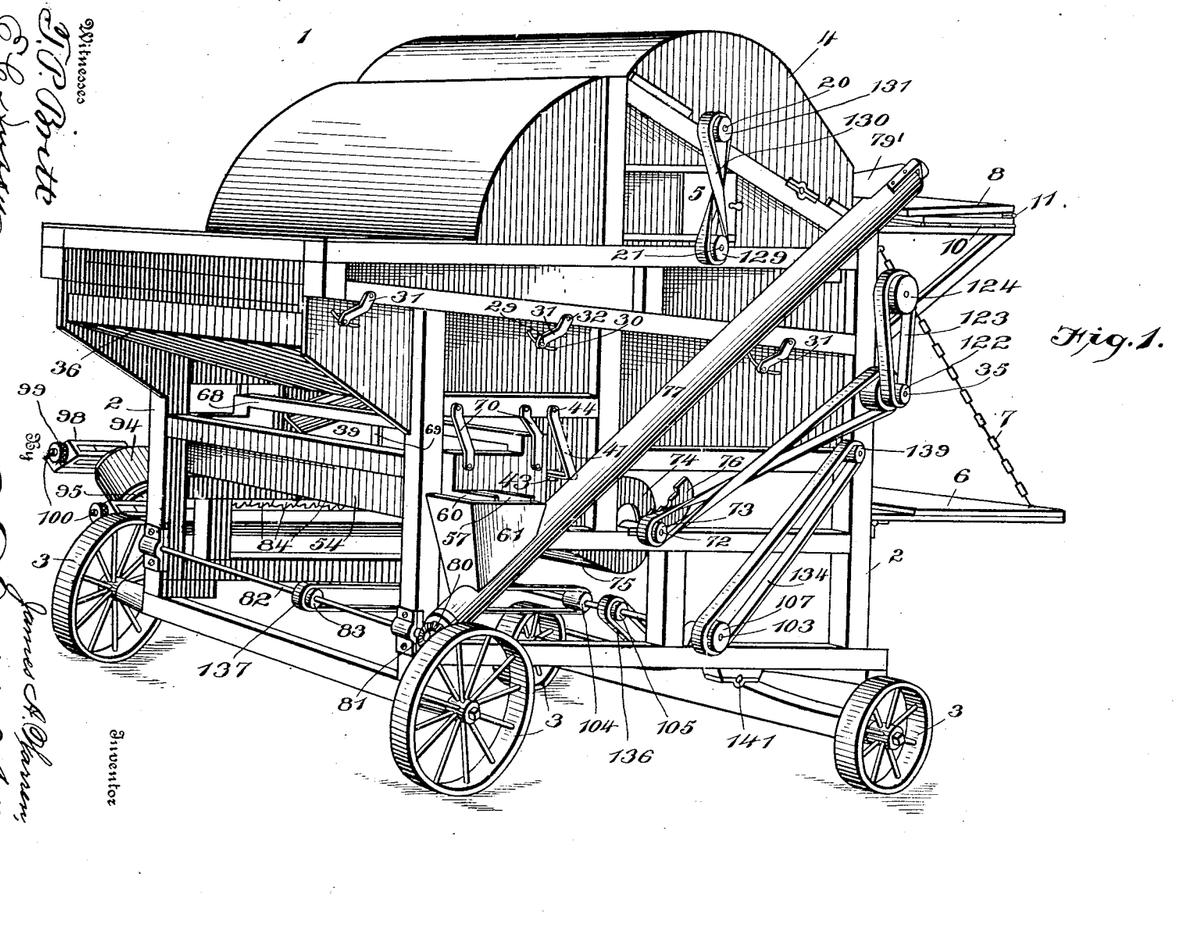
Figure 1 is a perspective view taken from the right side of the machine.
Figure 2:
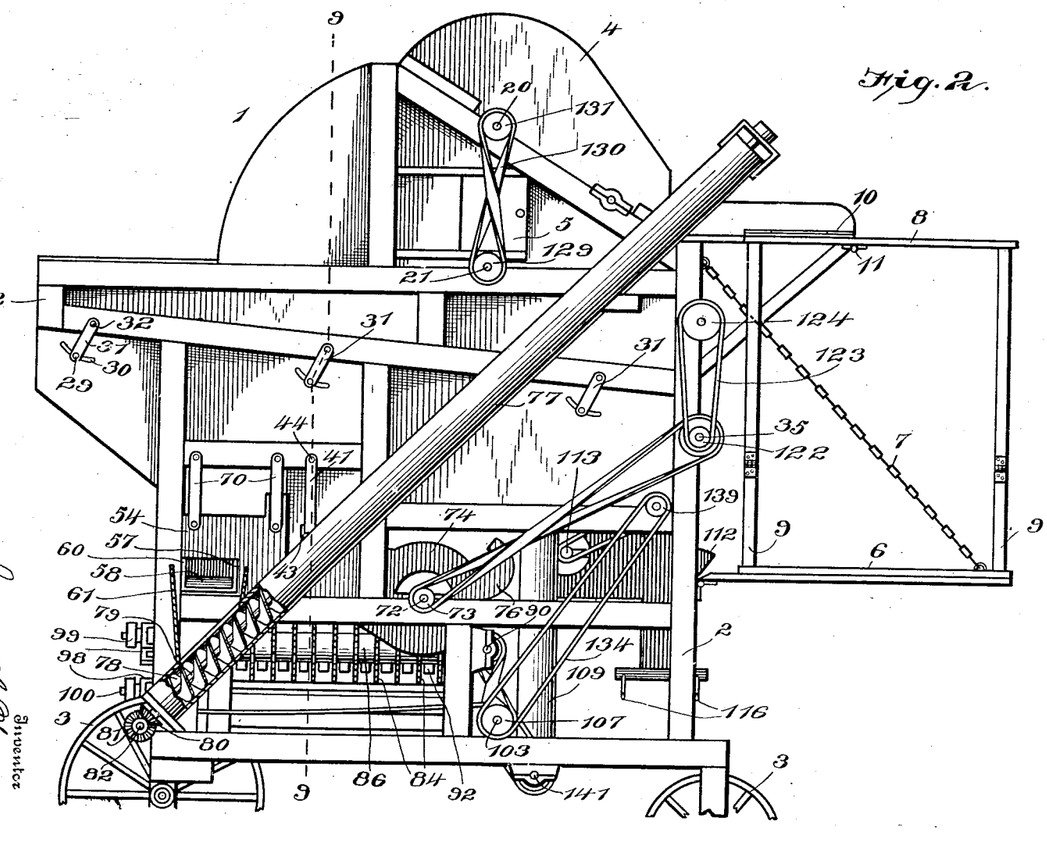
Fig. 2 is an elevation of the right side of the machine.
Figure 3:
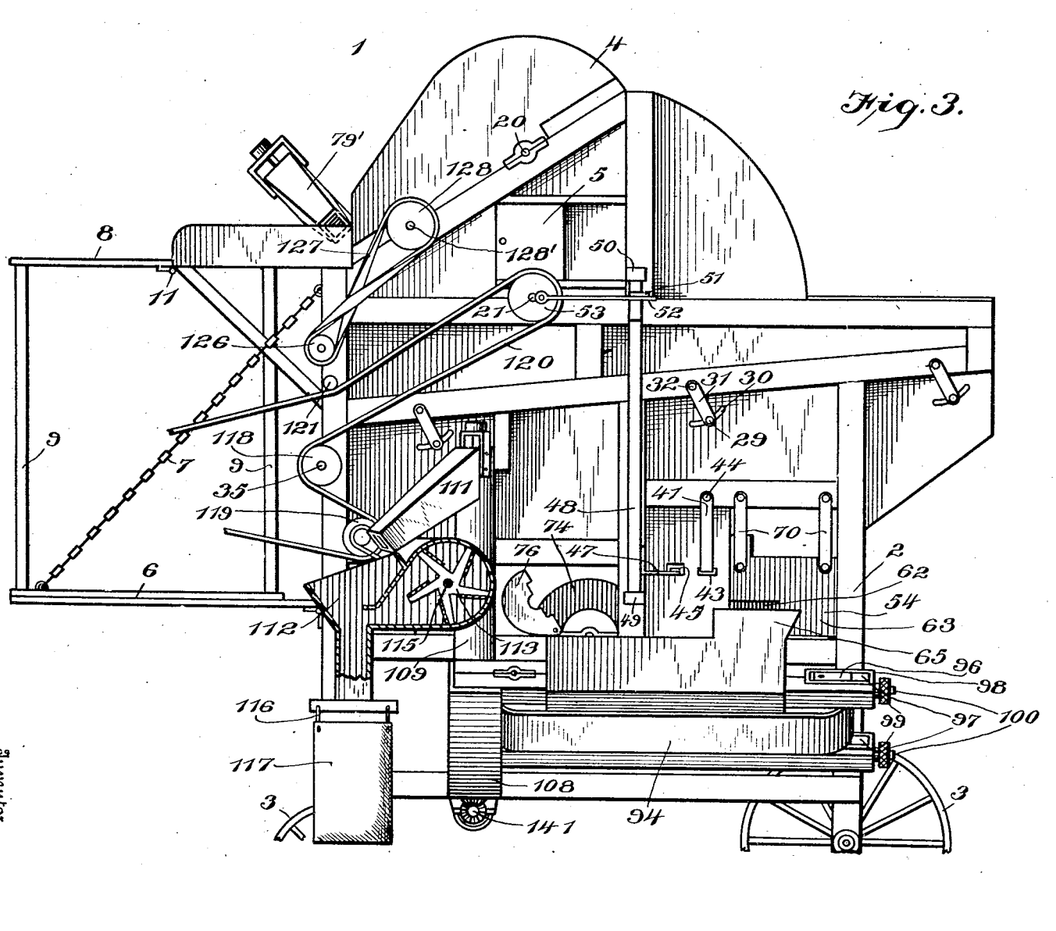
Fig. 3 is an elevation of the left side of the machine.

8 indicates a platform arranged above the platform 6 upon which the peanut vines are placed, said platform 8 being supported by means of uprights 9 as shown in Figs. 2 and 3. As will be noted in Fig. 1 a portion of the platform 8 is hinged at 10, and is arranged to be swung down into position shown in Fig. 7, when the machine is in operation. A portion of the platform is also hinged at 11 so that said portion can be folded up as shown in Fig. 1 when the machine is not in use. The platform thus folded as shown and described allows the machine to be more compact when not in use.

Figure 8:
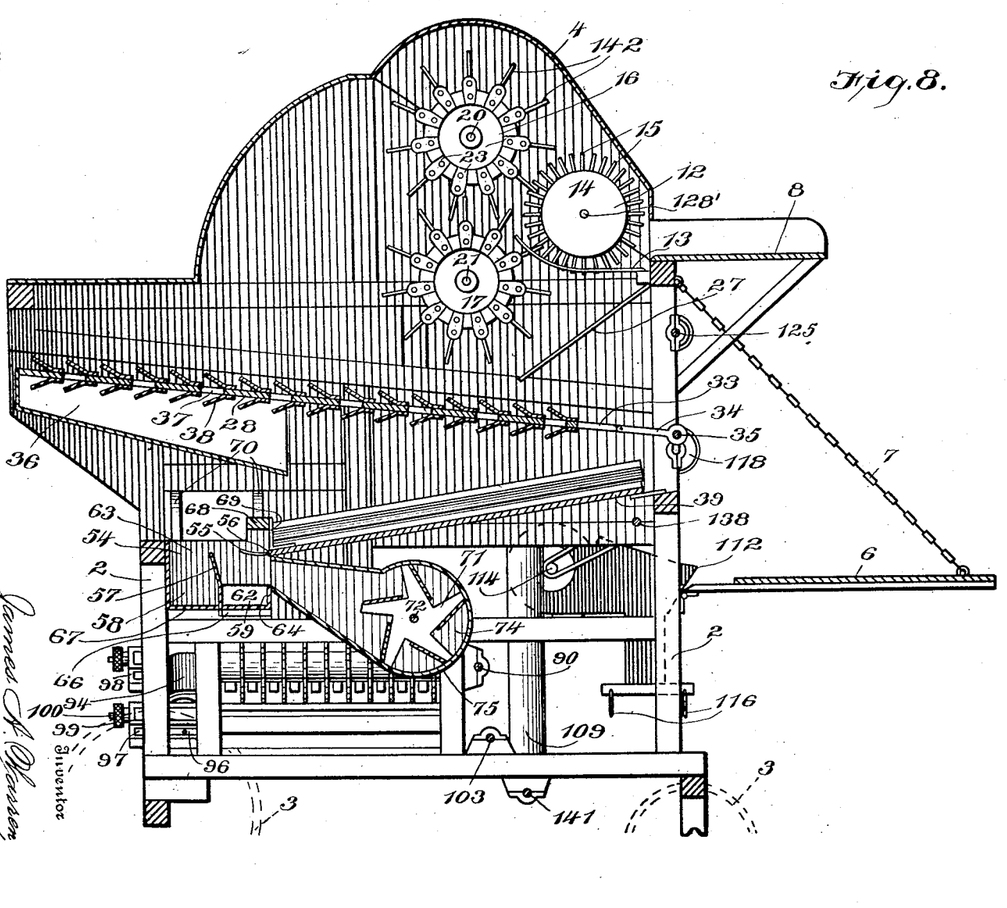
Fig. 8 is a vertical longitudinal sectional view through machine taken through line 8—8 of Fig. 4.
Figures 13, 14:
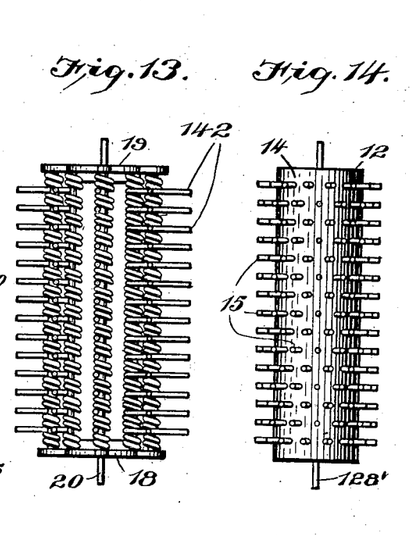
Fig. 13 is a top plan view of one of the picking rolls.
Fig. 14 is a top plan of one of the picking rolls.
Figure 15:
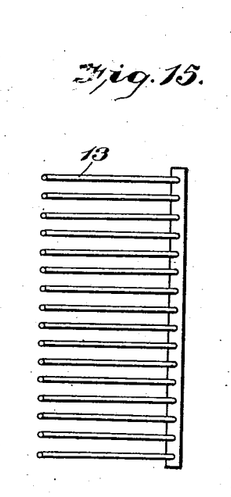
Fig. 15 is a top plan of the fingers under the picking roll shown in Fig. 14.
Figure 16:
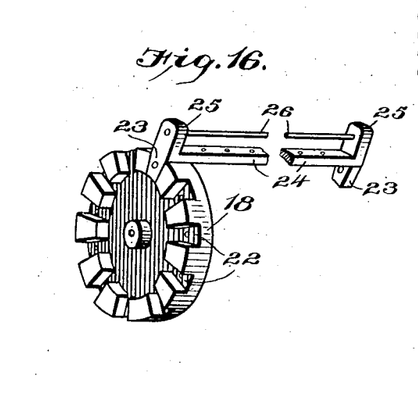
Fig. 16 is a perspective view of one of the disks and one of the finger holding rods and one of the finger holding bars of the picking rolls shown in Fig. 13.
Figure 17:
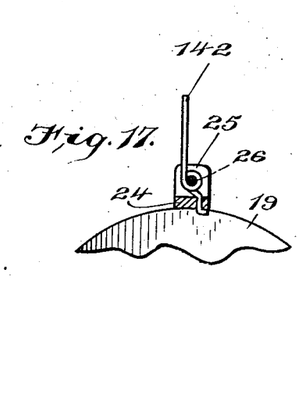
Fig. 17 is a fragmentary vertical sectional view through one of the picking rolls shown in Fig. 13, illustrating the construction of the fingers and construction for holding same in position.

Referring now to Fig. 8 it will be seen that a picking roll 12 is provided within the machine just behind the platform 8, and under said roll 12 a series of upwardly curved fingers 13 are arranged, said fingers being also shown in plan in Fig. 15. The said picking roll 12 (Fig. 14) comprises a tubular cylindrical portion 14 carrying a plurality of radially extending teeth or fingers 15. Arranged behind the picking roll 12 are two picking rolls 16 and 17 one above the other.
Referring to Figs. 13, 16 and 17 it will be seen that the said picking rolls 16 and 17 comprise two disks 18 and 19 keyed or otherwise rigidly secured to shafts 20 and 21. As will be seen from Fig. 16, the said disks are provided with radial notches 22 within which are secured the flanges 23 of the finger holding bars 24, said bars 24 being also provided with oppositely extending flanges 25 arranged to accommodate the finger holding rods 26 as clearly shown.

Figure 4:
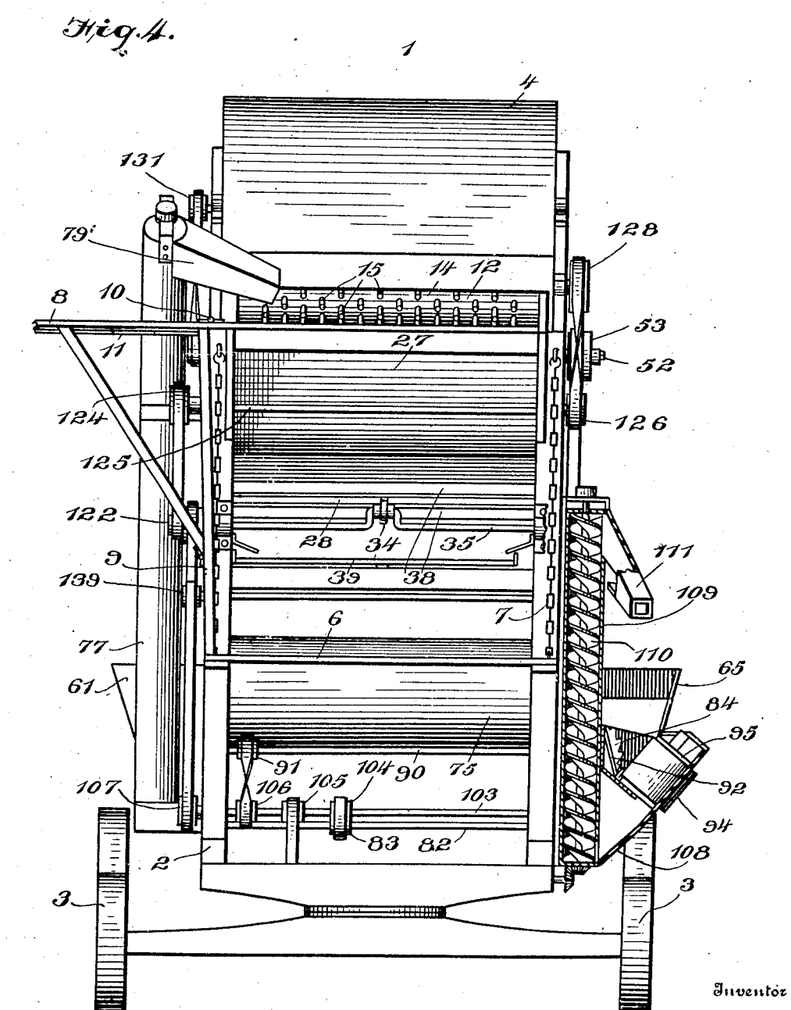
Fig. 4 is a front elevation partly in section.
Figure 11:
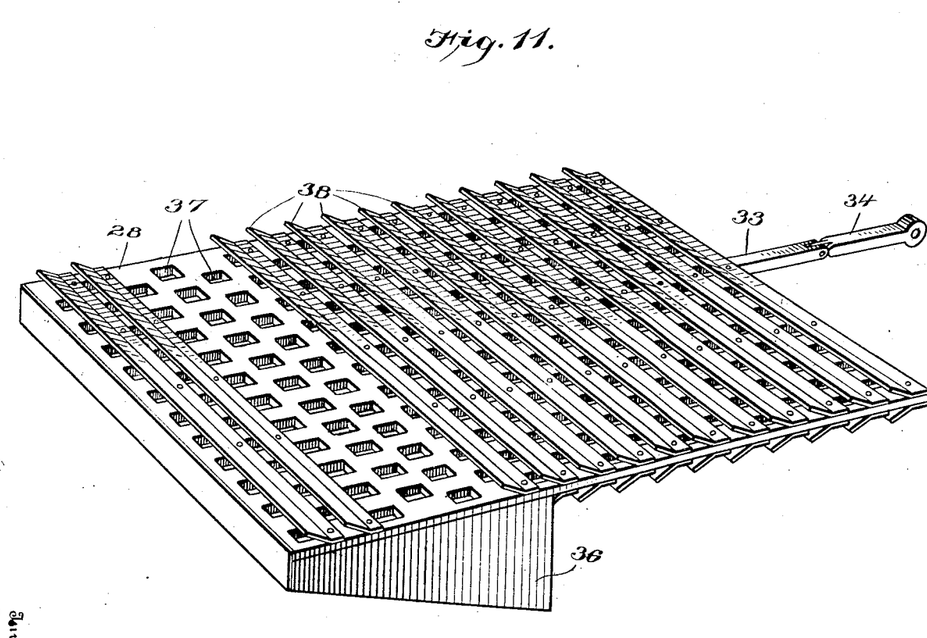
Fig. 11 is a perspective view of the reciprocating separator.

Secured in any convenient manner under the picking roll 12 and fingers 13 is a downwardly inclined chute 27. Arranged under said chute and picking rolls is the reciprocating separator 28, said separator being provided with a series of laterally extending pins 29, said pins passing through curved slots 30 in the sides of the machine as shown in Fig. 1.
31 indicates a series of links pivoted to the frame-work at 32 and also connected to the pins 29. By this construction the reciprocating separator 28 is suspended within the machine. Referring now to Fig. 11 which illustrates the separator in perspective, it will be seen that an extension 33 is provided on the forward end thereof to which extension is pivoted a link 34. Referring to Fig. 4 it will be seen that a shaft 35 is provided in front of the said separator 28, said shaft being bent to form a crank to which crank is secured the said link 34. Secured to the separator 28 under the rear portion thereof is a box 36 having its forward end open, and closed at its sides and rear end, the bottom thereof being inclined as shown in Fig. 8. Referring again to Fig. 11 it will be seen that the separator 28 is provided with a series of regularly located perforations 37, arranged in rows, and between each row of perforations is a plate 38 inclined as shown. A series of plates are arranged on the underside of the separator, said plates serving a purpose which will be hereinafter fully described. Arranged under the reciprocating separator 28 is the oscillating apron 39 shown in plan in Fig. 6. In this figure the said apron is shown pivoted to the framework of the machine at the forward end thereof at 40, and suspended at its rear end by means of links 41 (Figs. 1 and 6), said links being secured under the oscillating apron at 42 and passing laterally out through horizontal slots 43 in the side of the machine.
The said links are then bent upwardly and pivoted at 44 to the frame-work of the machine.

Figure 5:
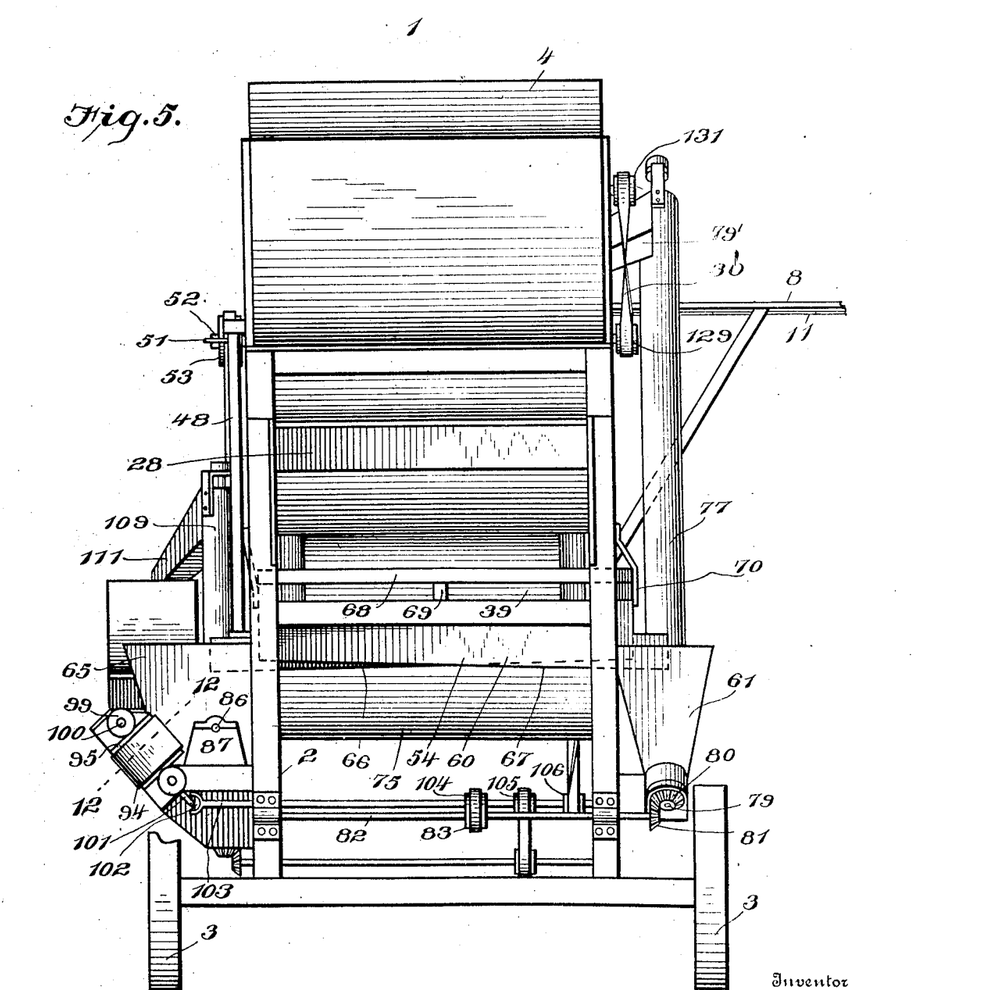
Fig. 5 is a rear elevation.
Figure 6:
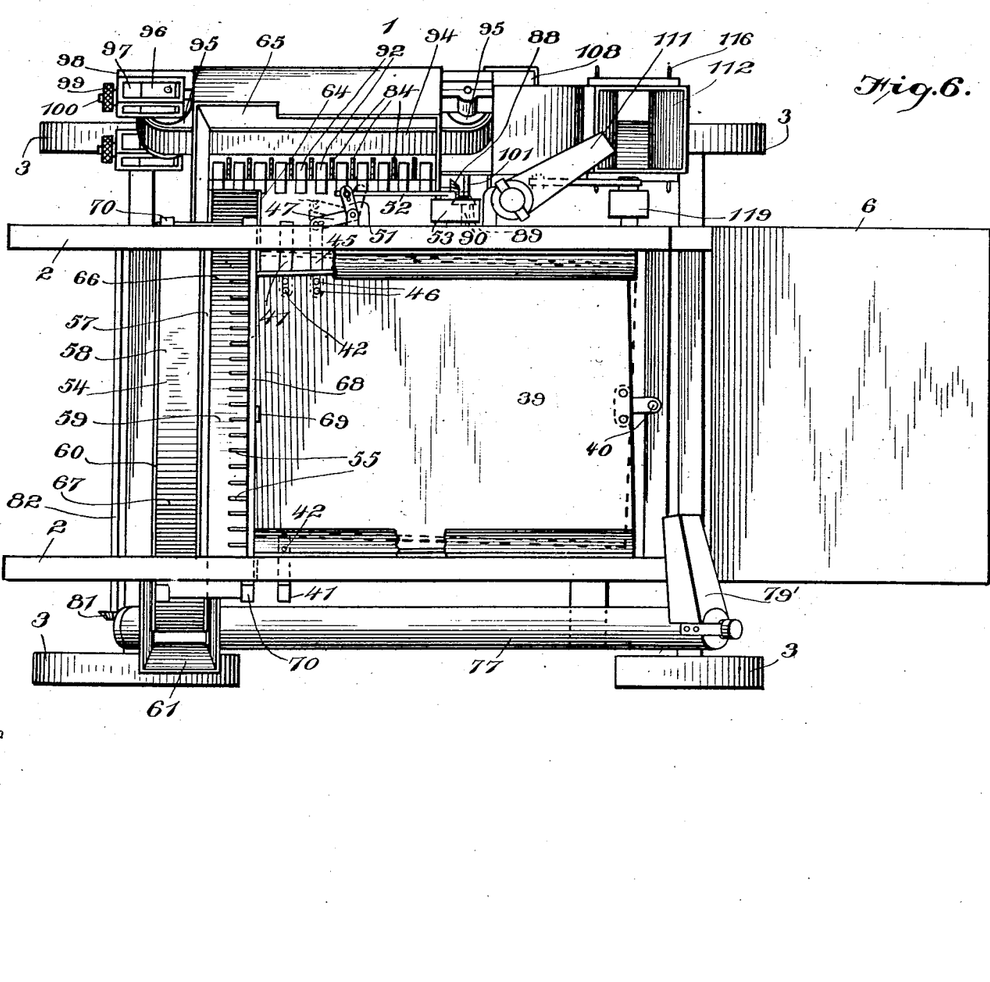
Fig. 6 is a plan view of the oscillating apron and exterior portions of machine, the picking means and reciprocating separator being removed.

Referring to Fig. 6 and also to Fig. 3, it will be seen that a laterally extending oscillating rod 45 is secured to one side of the apron at 46. Said rod extending through the side of the machine, is pivoted to a crank 47 secured to the rocking rod 48 (Fig. 3). Said rocking rod is arranged vertically, and is pivoted in a block or bearing 49 at its bottom end, and to a block or bearing 50 at its upper end. A crank 51 secured near the top of said rod and at right angles to the said crank 47 is pivoted to a pitman rod 52, which is eccentrically connected to a driving pulley 53, said driving pulley being on the end of the shaft 21 of the lower picking roll 17. Referring again to Fig. 6 and also to Figs. 5 and 8, it will be seen that a box or trough 54 is located below the oscillating apron 39 beyond the end thereof, and it will be seen that a series of longitudinal and curved fingers or pins 55 are arranged on the rear edge 56 of said apron, said fingers or pins extending over a portion of said box or trough. Referring particularly to Fig. 8 it will be seen that a central partition 57 is arranged longitudinally of the box or trough 54, thus forming two compartments 58 and 59. Referring now to Fig. 1, it will be seen that the said partition 57 and rear side 60 of the said box or trough extends through the side of the machine, entering a hopper 61, also shown in Fig. 5. Referring to Fig. 8 it will be seen that an opening 62 is provided in the side 63 of the said box or trough, and in Figs. 5 and 6 it will be seen that the said partition and forward side 64 of said box or trough extends through said opening, entering a hopper 65.
Referring now particularly to Fig. 5, it will be seen that the bottoms or floor 66 and 67 of the said two compartments are oppositely inclined in such manner that the material entering said compartments will tend to empty into the respective hoppers 61 and 65. In order to assist the emptying of the compartments into the hoppers, the said box or trough 54 is provided with a longitudinal rod 68 at the top thereof, (Figs. 1, 5, 6 and 8), said rod being connected to the oscillating apron 39 by means of a post 69, in such manner that the said box or trough oscillates with said apron. In order to allow said box or trough to move freely, the same is suspended from the frame-work of the machine by means of links 70 (Figs. 1 and 5). Referring now to Fig. 8, it will be seen that a fan 71 is provided below the oscillating apron 39, the blast being led rearwardly between the forward side 64 of the box or trough and the rear edge 56 of the oscillating apron 39, the shaft 72 of said fan being provided with a driving pulley 73, (Fig. 1) while the sides 74 of the fan casing 75 are provided with pivoted doors 76, (Figs. 1 and 3) to allow access to the fan and also to prevent draft passing through the casing.

Referring now to Figs. 1, and 2, it will be seen that the hopper 61 empties into a cylinder 77 containing a screw conveyer 78, said conveyer extending upwardly and forwardly to the top and front of the machine, at which point a chute 79' is provided for said conveyer, leading to the picking rolls 12, 16, and 17. The shaft 79 of said conveyer is provided with a bevel gear 80, meshing with a bevel gear 81 on a shaft 82 upon which is arranged a driving pulley 83. (Fig. 1).

Figure 7:
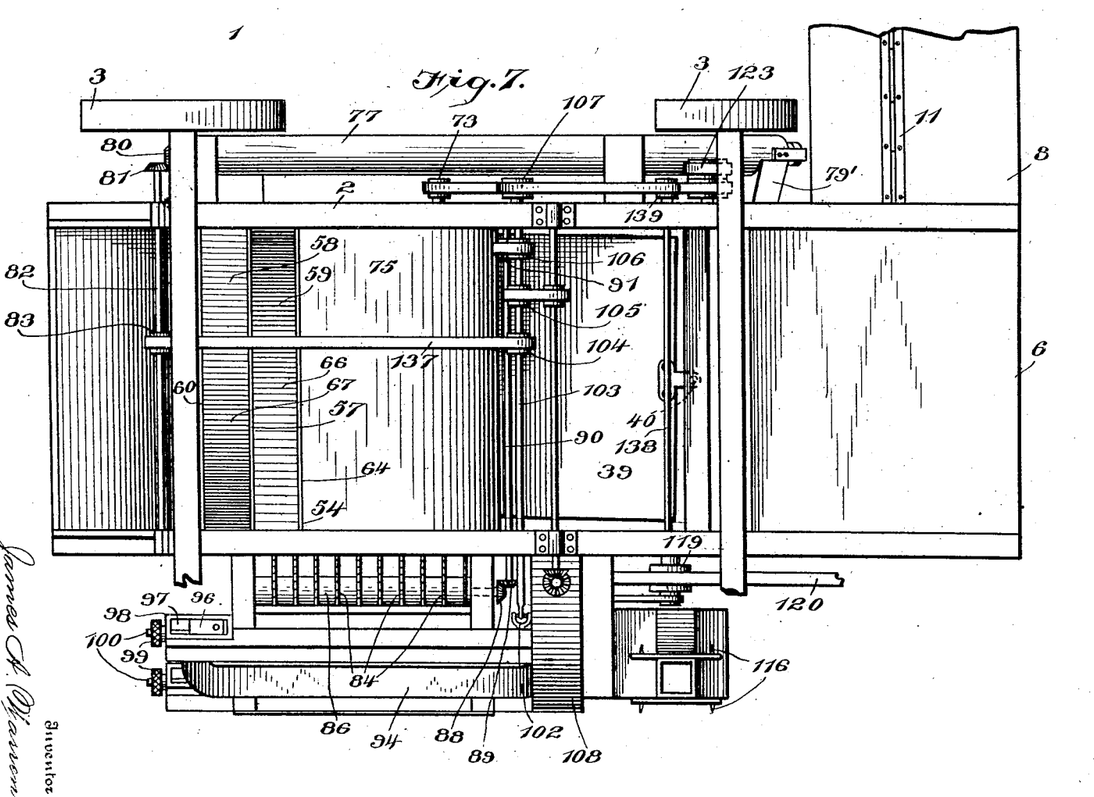
Fig. 7 is a bottom plan view of machine.
Figure 9:
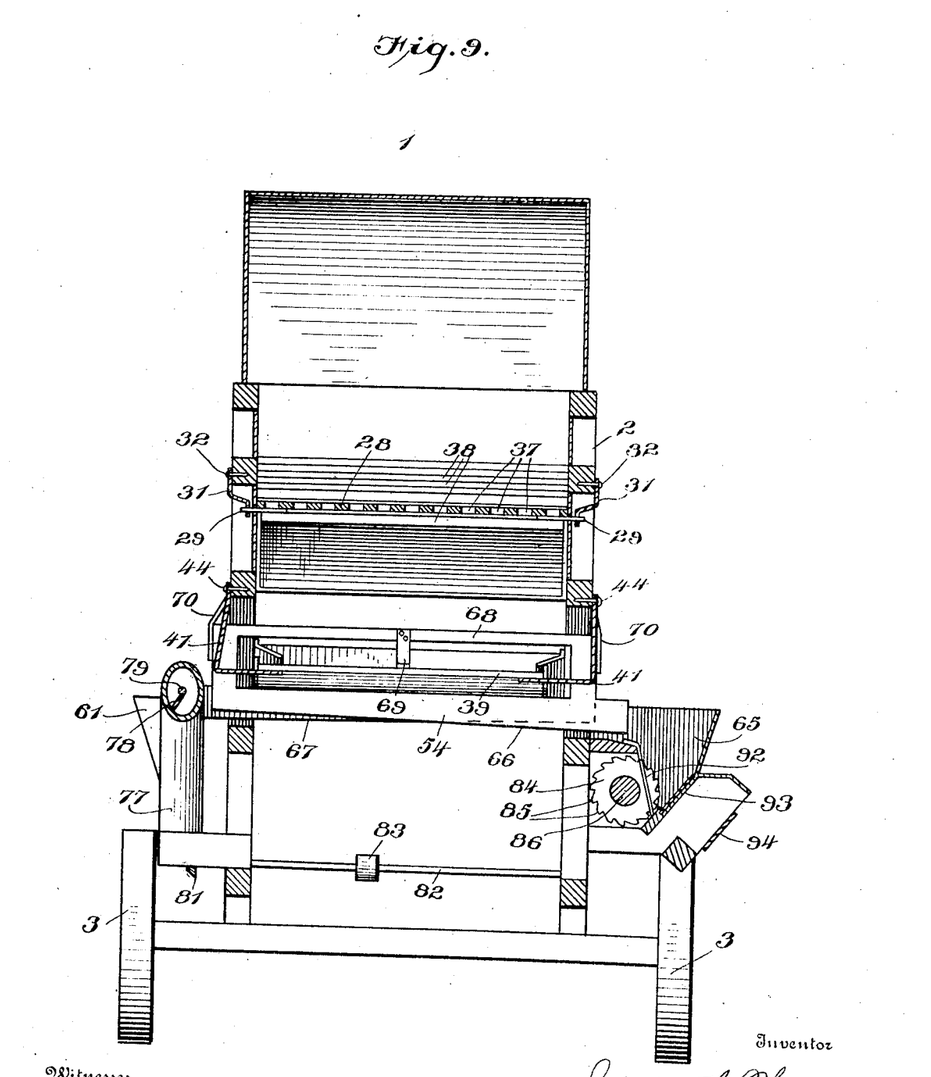
Fig. 9 is a vertical transverse section taken through line 9—9 of Fig. 2.
Figure 12:
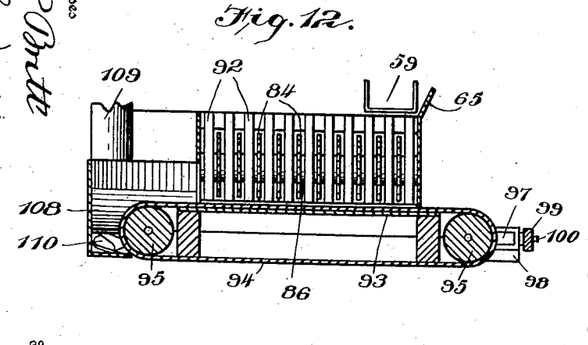
Fig. 12 is a vertical longitudinal section taken through line 12—12 of Fig. 5.

Referring now to Figs. 5, 6 and 9, and also to Fig. 12, it is seen that the stemming mechanism comprises the hopper 65 into which the forward compartment 58 of the box or trough 54 empties. Arranged longitudinally of the machine are the stemming disks 84 provided with teeth 85 somewhat similar to those of a circular saw. Said disks are secured on a shaft 86 journaled in a rear bearing 87 (Fig. 5), and provided with a bevel gear 88 at its forward end (Fig. 6) which meshes with a bevel gear 89 on a shaft 90, which shaft is provided with a driving pulley 91 (Fig. 7).

92 indicates a series of metal strips or plates arranged between each of the stemming disks 84 in such manner that only a small number of the teeth 85 of the disks extend beyond the said plates 92.

The bottom 93 of the hopper 65 is inclined as shown in Fig. 9, and arranged over the said bottom 93 is an endless belt or apron 94 passing over drums 95 as shown in Fig. 12. The forward drum is journaled in any convenient manner, while the rear drum 95 is journaled in two blocks or slides 96 arranged in slots 97 in the frame pieces 98, and an adjusting device consisting of thumb screws 99 threaded on pins 100 provide for moving said blocks or slides 96 in the slots 97 in order to adjust the tension of the belt or apron 94. In place of this construction any well known tightening device may of course be employed.

Connected to the shaft 101 of the forward drum 95 by means of a universal joint 102, is a shaft 103 upon which is carried four driving pulleys 104, 105, 106 and 107. At the forward end of the belt or apron is a chute 108 (Fig. 12) which empties into the vertical cylinder 109 within which is a screw conveyer 110 (Fig. 4), said cylinder being provided with a chute 111 at its upper end which empties into a hopper 112 (Fig. 3). Associated with said hopper is a fan 113 having its shaft belted to a driving pulley 114 on a shaft 115, the fan being so arranged as to throw a draft of air across the hopper. Arranged at the bottom of the hopper are suitable hooks 116 upon which a sack 117 is suspended into which the hopper empties.

Figure 10:
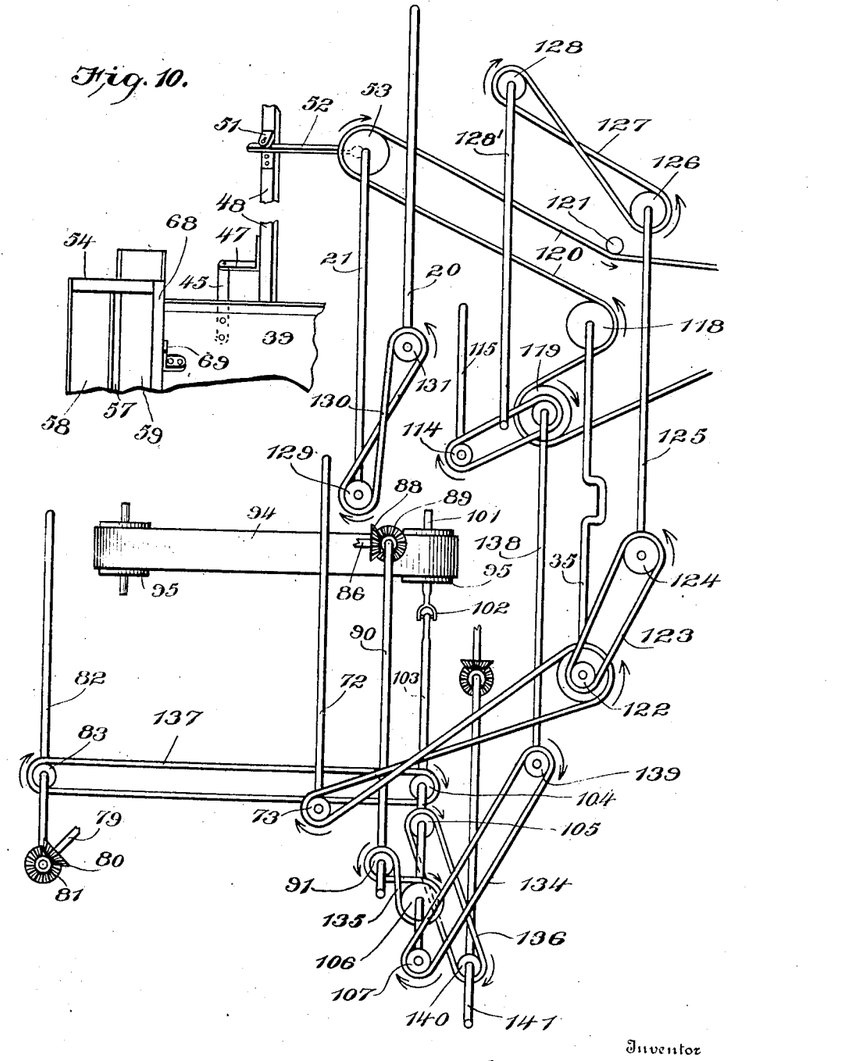
Fig. 10 is a diagrammatic view of gearing and shafting.

Referring now to Fig. 10 which is a diagrammatic view of the belting and shafting, it will be seen that the pulley 118 on the crank shaft 35, the pulley 53 carrying the pitman 52 and the pulley 119 on the shaft 138 are the main driving pulleys, over which a driving belt 120 is arranged as shown. An idler 121 is located as shown in Fig. 3 to give the belt a fair lead to the source of power.

Belted to the small pulley 122 on the crank shaft by a belt 123 is the pulley 124 on the shaft 125, and on the opposite end of said shaft is a pulley 126 belted by a belt 127 to the pulley 128 on the forward picking-roll shaft.

Referring now to the pulley 53 carrying the pitman 52, this pulley is located on the shaft 21 of the lower picking-roll 17, and belted to the pulley 129 on said shaft by means of the belt 130 is the pulley 131 on the shaft 20 of the upper picking-roll 16, said belt being crossed in order to reverse the direction of the rotation of the said picking-rolls, so that the forward picking roll 12 and the lower picking roll 17 rotate in the direction of the hands of a watch, while the upper picking-roll 16 rotates in the contrary direction as indicated by the arrows.

Belted to the pulley 122 on the crank shaft 35 is the small pulley 73 on the shaft 72 of the fan 71 and belted to the pulley 119 on the shaft 138 is the small pulley 114 on the shaft 115 of the fan 113 for the hopper 112. Belted to the pulley 139 on the shaft 138 by means of the belt 134 is the pulley 107 on the shaft 103, which shaft drives the belt or apron 94 by means of the forward drum 95 connected to said shaft by the universal joint 102. Belted to the pulley 106 on said shaft 103 by means of the belt 135 is the pulley 91 on the shaft 90 carrying the bevel gear 89 which drives the stemming disks 84 and their shaft 86. Belted to the pulley 105 on the shaft 103 by means of the belt 136 is the pulley 140 on the shaft 141 carrying the bevel gear which drives the vertical screw conveyer 110, and belted to the pulley 104 on the said shaft 103 by means of the belt 137 is the pulley 83 on the shaft 82 carrying the bevel gear 81 which drives the screw conveyer 78, the direction of rotation of each of the shafts and pulleys being indicated by arrows.

Having thus fully described the several parts of my invention its operation is as follows: The platform 6 is so located that an operator standing thereon will be in the proper position to feed peanut vines from the folding platform 8 to the picking-rolls. Referring now to Fig. 8, the forward picking-roll 12 and the lower picking-roll 17 rotates in the direction of the hands of a watch, while the upper picking-roll 16 rotates in the opposite direction. The vines enter the machine between the forward picking-roll 12 and the curved pins 13. The radial teeth or pins 15 on the forward roll entering between the said curved teeth, pick the peanuts from the vines, allowing the peanuts to fall upon the chute 27 which leads them to the separator 28. Those peanuts which are not picked from the vines by the action of the forward picking roll, are carried with their vines between the upper and the lower picking rolls 16 and 17, which are rotating in opposite directions. As shown the spring fingers 142 of said latter rolls mesh with each other and also with the pins 15 on the forward picking roll 12. These fingers and pins rotating in this manner tear the vines and strip the peanuts therefrom, while at the same time the fingers 142 on the upper and lower rolls 16 and 17 being resilient will not crush or crack the peanuts. The vines passing from the picking rolls fall together with the picked peanuts upon the reciprocating separator 28. The plates 38 on said separator being slanted forward and covering the perforations 37 therein prevent the vines from choking the perforations, while the rapid reciprocating movement of the separator works the peanuts under the plates 38 allowing them to pass through the perforations 37 in the separator 28 and upon the bottom plates 38 under the said perforations to the oscillating apron 39. The rear edges of the upper plates 38 engage the vines, the reciprocating movement forcing said vines toward the rear of the separator and finally out through the rear of the machine. Those peanuts which may be in the vines and which are worked through the separator at the rear thereof, fall in the box 36 attached to the separator and thence to the oscillating apron 39. The peanuts and some small portions of the vines being now on the oscillating apron 39, the motion of said apron causes the peanuts to go to the bottom and the portions of the vines to raise to the top. When the peanuts reach the rear end of the apron, they fall between the curved pins or teeth 55 on the rear edge of the apron into the forward receptacle 59 of the box 54 and as they are falling they are subjected to the blast from the fan 71, which carries away all dust and fragments of vines out through the rear of the machine. Those fragments of vines which have peanuts still attached are blown across the partition 57 in the box 54 and fall into the rear receptacle 58 of said box. It will be observed from the foregoing description of the machine, that the said box is connected to the apron and is oscillated therewith, and it will also be observed that the floors or bottoms 66 and 67 of the compartments 58 and 59 of the box 54 are inclined in opposite directions; consequently the peanuts in the forward compartment 59 pass out through the opening 62 in the side of the machine and empty into the hopper 65 of the stemming device. The stemming disks are rotating in the contrary direction to the hands of a watch (Fig. 9), and as the endless belt or apron 94 feeds the peanuts along the series of stemming disks 84, the teeth on said disks catch the stems on the peanuts and remove them, while at the same time, the teeth on the disks are not of such a size and character as to be able to crush or injure the peanuts themselves. As the peanuts reach the end of the series of stemming disks, they empty into the chute 108 leading into the screw conveyer 110 which raises the peanuts and delivers them into the hopper 112, and as the peanuts are falling through the hopper, they are subjected to the blast from the fan 113, which thoroughly cleans the peanuts and blows out the stems, so that the peanuts when emptying into the sack 117 are ready for the market without any further treatment.

Returning to the peanuts with fragments of vines attached which are carried by the blast from the fan 71 into the rear compartment of the box 58, the oscillating movement of the said box delivers the said vines and peanuts into the hopper 61 which leads them into the screw conveyer 78. The vines and peanuts are by this means raised to the top and front of the machine and are led through the chute 79' to the picking rolls where they are a second time subjected to the picking operation and subsequent operations just described. By this means all of the peanuts are picked, separated from the vines and stemmed, while of course some of the vines may pass through the machine several times before all of the peanuts have been picked therefrom.

Having thus fully described my invention, I do not wish to be understood as limiting myself to the exact construction herein set forth as various slight changes may be made therein which would fall within the limit and scope of my invention as defined in the following claims, and I consider myself clearly entitled to all such changes and modifications.

What I claim as my invention and desire to secure by Letters Patent of the United States is:

1. In a machine of the character described, the combination of suitable mechanism for picking the peanuts from their vines, a reciprocating separator for separating the picked peanuts from their vines, an oscillating apron upon which the peanuts are delivered from the said separator, a fan or blower arranged to throw a blast of air upon the peanuts passing from said apron, suitable receptacles associated with said apron for receiving the picked peanuts passing from said apron and for receiving the peanuts with short vines attached passing from said apron, suitable mechanism for stemming the picked peanuts, a fan or blower arranged to throw a draft of air upon said peanuts after being stemmed to separate the peanuts from their stems, and means for conveying the peanuts with short vines attached passing from said apron to the said mechanism for picking the peanuts from their stems, substantially as described.

2. In a machine of the character described, the combination of suitable mechanism for picking the peanuts from their vines, a reciprocating separator for separating the picked peanuts from their vines, an oscillating apron upon which the peanuts are delivered from the said separator, a fan or blower arranged to throw a blast of air upon the peanuts passing from said apron, suitable receptacles associated with said apron for receiving the picked peanuts passing therefrom and for receiving the peanuts with short vines attached passing from said apron, suitable mechanism for stemming the picked peanuts, means for separating the peanuts from their stems after the said peanuts have been stemmed, and means for conveying the peanuts with short vines attached passing from said apron to the said mechanism for picking the peanuts from their stems, substantially as described.

3. In a machine of the character described, the combination of suitable mechanism for picking the peanuts from their vines, a reciprocating separator for separating the picked peanuts from their vines, an oscillating apron upon which the peanuts are delivered from the said separator, means for separating the picked peanuts from the peanuts with short vines attached, a suitable receptacle for receiving the picked peanuts passing from the said apron, and a suitable receptacle for receiving the peanuts with short vines attached passing from said apron, means for conveying the peanuts with short vines attached to the said mechanism for picking the peanuts from their vines, means for stemming the picked peanuts and means for separating the peanuts from their stems after the peanuts have been stemmed, substantially as described.

4. In a machine of the character described, the combination of suitable mechanism for picking the peanuts from their vines, a reciprocating separator for separating the picked peanuts from their vines, an apron upon which the peanuts are delivered from the said separator, means for separating the picked peanuts from the peanuts with short vines attached, means for conveying the peanuts with short vines attached to the said mechanism for picking the peanuts from their vines, means for stemming the peanuts and means for separating the peanuts from their stems after the peanuts have been stemmed, substantially as described.

5. In a machine of the character described, the combination of suitable mechanism for picking the peanuts from their vines, a separator for separating the picked peanuts from their vines, an apron upon which the peanuts are delivered from the said separator, means for separating the picked peanuts from the peanuts with short vines attached, means for conveying the peanuts with short vines attached to the said mechanism for picking the peanuts from their vines, means for stemming the peanuts and means for separating the peanuts from their stems after the peanuts have been stemmed, substantially as described.

6. In a machine of the character described, the combination of suitable mechanism for picking the peanuts from their vines, a reciprocating separator for separating the picked peanuts from their vines, an oscillating apron upon which the peanuts are delivered from the said separator, means for separating the picked peanuts from the peanuts with short vines attached, a suitable oscillating receptacle for receiving the picked peanuts, and a suitable oscillating receptacle for receiving the peanuts with short vines attached, substantially as described.

7. In a machine of the character described, the combination of suitable mechanism for picking the peanuts from their vines, a separator for separating the picked peanuts from their vines, an apron upon which the peanuts are delivered from the said separator, means for separating the picked peanuts from the peanuts with short vines attached, an oscillating receptacle for receiving the picked peanuts, and an oscillating receptacle for receiving the peanuts with short vines attached, said receptacles being secured to said apron substantially as described.

8. In a machine of the character described, the combination of suitable mechanism for picking the peanuts from their vines, a separator for separating the picked peanuts from their vines, an oscillating apron upon which the peanuts are delivered from the said separator, means for separating the picked peanuts from the peanuts with short vines attached, and an oscillating receptacle to receive the picked peanuts and to receive the peanuts with short vines attached, said receptacle being connected to and oscillated by the said oscillating apron, substantially as described.

9. In a machine of the character described, suitable mechanism for picking the peanuts from their vines, said mechanism comprising a picking roll having its periphery provided with a series of radially extending pins and two picking rolls associated with said first mentioned roll, said two picking rolls being provided with a series of flexible teeth or pins, the said two picking rolls having their teeth intermeshing with the pins on said first mentioned roll and also their teeth intermeshing with the teeth on each other, substantially as described.

10. In a machine of the character described, a suitable mechanism for picking the peanuts from their vines, said mechanism comprising a picking roll having its periphery provided with a series of radially extending pins or teeth and a picking roll associated with said first mentioned picking roll, said last mentioned picking roll being provided with a series of teeth or pins, more flexible than the pins or teeth on said first mentioned roll said teeth or pins being arranged to intermesh with the teeth or pins on said first mentioned roll, substantially as described.

11. In a machine of the character described, suitable mechanism for picking the peanuts from their vines, said mechanism comprising two picking rolls, one of said picking rolls being provided with flexible teeth more flexible than the teeth or pins on the other picking roll so arranged as to intermesh with teeth or pins on the other picking roll, and means for rotating said picking rolls in opposite directions, substantially as described.

12. In a machine of the character described, suitable mechanism for picking the peanuts from their vines, said mechanism comprising a picking roll provided with toothed disks having radial notches therein, a series of flanges constructed to enter said notches, finger holding bars secured to said flanges, and flexible fingers or teeth secured to said finger holding bars, substantially as described.

13. In a machine of the character described, suitable mechanism for picking the peanuts from their vines, said mechanism comprising a picking roll provided with radially extending pins or teeth on the periphery thereof, a series of fingers arranged under said picking roll with which the radial extending pins on said picking roll intermesh, and a picking roll associated with said first mentioned picking roll and provided with a series of flexible fingers or teeth arranged to intermesh with the radially extending pins on said first mentioned picking roll, substantially as described.

In testimony whereof, I affix my signature, in presence of two witnesses.

JAMES ARTHUR WARREN.

Witnesses:
J. B. SEWARD,
J. H. PRICE.